US012720204B2

(12) United States Patent
Gnanasambandam et al.

(10) Patent No.: US 12,720,204 B2
(45) Date of Patent: Aug. 25, 2026

(54) SYNCHRONIZED MULTI-LENS MULTI-FRAME CAPTURE AND POST-CAPTURE EDITING

(71) Applicant: Samsung Electronics Co., Ltd., Suwon-si (KR)

(72) Inventors: Abhiram Gnanasambandam, Frisco, TX (US); Gunawath Dilshan Godaliyadda, Allen, TX (US); John Seokjun Lee, Allen, TX (US); Hamid Rahim Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 18/977,763

(22) Filed: Dec. 11, 2024

(65) Prior Publication Data

US 2025/0247623 A1 Jul. 31, 2025

Related U.S. Application Data

(60) Provisional application No. 63/625,881, filed on Jan. 26, 2024.

(51) Int. Cl.
*H04N 23/69* (2023.01)
*H04N 23/63* (2023.01)
*H04N 23/80* (2023.01)

(52) U.S. Cl.
CPC .......... *H04N 23/69* (2023.01); *H04N 23/632* (2023.01); *H04N 23/80* (2023.01)

(58) Field of Classification Search
CPC ....... H04N 23/69; H04N 23/80; H04N 23/632
USPC ...................................................... 348/240.1
See application file for complete search history.

(56) References Cited

U.S. PATENT DOCUMENTS 9,501,139 B2 * 11/2016 Kim ...................... H04N 23/62
9,538,152 B2 1/2017 Shabtay et al.
9,769,388 B2 * 9/2017 Han .................... H04N 23/743
9,998,651 B2 6/2018 Bandlamudi et al.
10,136,071 B2 * 11/2018 Han .................... H04N 5/2621
10,645,272 B2 5/2020 Srivastava et al.
10,834,310 B2 11/2020 Baldwin et al.
(Continued)

FOREIGN PATENT DOCUMENTS

JP 2005-223905 A 8/2005
JP 2010263619 A 11/2010
(Continued)

OTHER PUBLICATIONS

Peng, C. et al., "ReWiTe: Realistic Wide-angle and Telephoto Dual Camera Fusion Dataset via Beam Splitter Camera Rig," arXiv:2404.10584v2, Apr. 30, 2024, 9 pages.
(Continued)

*Primary Examiner* — Pritham D Prabhakher

(57) ABSTRACT

A camera with multiple lenses providing different optical zoom levels captures time-aligned frames from each lens concurrently based on a user control. The user indicates a desired post-capture zoom level for the image on a user interface. Based on the user-selected zoom level, selected frames are fused and a digital zoom is determined based on the lenses' optical zoom levels and the desired post-capture zoom level. A multi-frame image processing pipeline generates a final image having the digital zoom using the fused frames.

20 Claims, 13 Drawing Sheets

(56) References Cited

U.S. PATENT DOCUMENTS 11,632,497 B2 4/2023 Wang et al.
11,683,466 B2 * 6/2023 Kim .................... H04N 13/239 348/207.99
11,756,221 B2 * 9/2023 Feng ........................ G06T 5/50 348/135
11,956,527 B2 4/2024 Baldwin et al.
12,022,196 B2 6/2024 Cohen et al.
12,028,609 B2 7/2024 Liu et al.
12,526,515 B2 * 1/2026 Shao ...................... H04N 23/62
2005/0168594 A1 * 8/2005 Larson ................. H04N 23/698 348/222.1
2009/0091645 A1 * 4/2009 Trimeche ............. H04N 25/134 348/218.1
2014/0354561 A1 * 12/2014 Kim ........................ G06F 3/041 345/173
2015/0207999 A1 * 7/2015 Han ....................... H04N 23/69 348/240.3
2016/0381282 A1 * 12/2016 Bandlamudi .......... H04N 23/69 348/240.3
2018/0007281 A1 * 1/2018 Han ....................... H04N 23/69
2019/0034756 A1 * 1/2019 Kim ....................... H04N 23/90
2019/0174054 A1 * 6/2019 Srivastava ............. H04N 23/63
2020/0358954 A1 * 11/2020 Wang ..................... H04N 23/61
2021/0144292 A1 * 5/2021 Wang ..................... H04N 23/62
2021/0168300 A1 * 6/2021 Wang ................... H04N 23/698
2022/0060674 A1 * 2/2022 Kim .......................... G06T 3/40
2022/0086333 A1 * 3/2022 Baldwin ................. G06T 11/60
2022/0201208 A1 * 6/2022 Liu ........................ H04N 23/45
2022/0237813 A1 * 7/2022 Feng .......................... G06T 5/50
2023/0388638 A1 * 11/2023 Cohen .................... H04N 23/45
2024/0259679 A1 8/2024 Shao et al.

FOREIGN PATENT DOCUMENTS

JP 2010-539745 A 12/2010
JP 2022-036930 A 3/2022
KR 10-2014-0142587 12/2014
KR 10-2015-0086091 7/2015

OTHER PUBLICATIONS

Campbell, N. et al., "Using Multiple Hypotheses to Improve Depth-Maps for Multi-View Stereo," In Computer Vision—ECCV 2008: 10th European Conference on Computer Vision, Marseille, France, Oct. 12-18, 2008, Proceedings, Part I 10, pp. 766-779, Springer Berlin Heidelberg.

International Search Report and Written Opinion of the International Searching Authority dated Apr. 30, 2025 in connection with International Patent Application No. PCT/KR2025/001332, 10 pages.

* cited by examiner

SYNCHRONIZED MULTI-LENS MULTI-FRAME CAPTURE AND POST-CAPTURE EDITING

CROSS-REFERENCE TO RELATED APPLICATIONS AND PRIORITY CLAIM

This application claims priority under 35 U.S.C. § 119 (e) to U.S. Provisional Patent Application No. 63/625,881 filed on Jan. 26, 2024, which is hereby incorporated by reference in its entirety.

TECHNICAL FIELD

This disclosure relates generally to multi-frame processing. More specifically, this disclosure relates to exploiting frames from multiple image sensors having different associated zoom levels.

BACKGROUND

Many mobile phones that include a camera are equipped with more than one camera on the rear side of the device. For example, some phones have four image sensors, each having a respective zoom level (e.g., 0.6×, 1×, 3×, and 5× zoom). However, most image capture is performed using a single image sensor. Each capture may be composed of more than one frame, but all frames are from a single sensor that captures the frames, usually sequentially. This technology is known as multi-frame processing (MFP).

With such MFP pipelines, the images captured by the individual sensors are processed to form a single output image at a certain zoom level based on the sensor used to capture the scene. For example, if an image with a person in the background is captured by the 1× sensor, and the photographer wants to extract the face of the subject, the detail level will be poor as compared to capturing the person with (for example) a 5× zoom. Conversely, if the subject was captured using a zoom lens, but the photographer later wants the background as well, there is no way to retrieve the background. Therefore, a limitation of single lens capture is that the photographer is limited by the field-of-view (FOV) of the lens for the image sensor corresponding to the selected zoom level. As a result, the photographer cannot zoom out post capture and, even though the photographer can zoom in, the level of detail will be inferior compared to capture with a zoom lens.

SUMMARY

This disclosure relates to synchronized multi-lens, multi-frame image capture and post-capture editing.

In a first embodiment, a method of generating an image from a multi-lens, multi-frame capture includes displaying a first user interface for capturing an image using multiple lenses on a user device, each of the multiple lenses having a respective optical zoom level. The method also includes, in response to a first user input, capturing multiple frames from each of the multiple lenses, wherein frames captured from any first one of the multiple lenses are time-aligned to frames captured from any second one of the multiple lenses. The method further includes displaying a second user interface for selecting a desired post-capture zoom level for the image. The method still further includes, in response to a second user input that selects the desired post-capture zoom level for the image, selecting lenses to use for an image fusing operation based on the desired post-capture zoom level for the image. The method includes fusing time-aligned frames from the selected lenses to generate multiple fused frames having a given optical zoom level. The method includes determining a digital zoom level for a digital zoom based on the given optical zoom level and the desired post-capture zoom level. The method includes generating the image based on a multi-frame processing (MFP) pipeline having the digital zoom operating on the multiple fused frames.

In a second embodiment, an electronic device for use in generating an image from a multi-lens, multi-frame capture includes a display configured to display a first user interface for capturing an image using multiple lenses on a user device, each of the multiple lenses having a respective optical zoom level, where the display is configured to display a second user interface for selecting a desired post-capture zoom level for the image. The electronic device also includes a plurality of image sensors configured, in response to a first user input, to capture multiple frames from each of the multiple lenses, wherein frames captured from any first one of the multiple lenses are time-aligned to frames captured from any second one of the multiple lenses. The electronic device further includes a processor configured, in response to a second user input that selects the desired post-capture zoom level for the image, to select lenses to use for an image fusing operation based on the desired post-capture zoom level for the image. The processor is also configured to fuse time-aligned frames from the selected lenses to generate multiple fused frames having a given optical zoom level. The processor is further configured to determine a digital zoom level for a digital zoom based on the given optical zoom level and the desired post-capture zoom level. The process is still further configured to generate the image based on a multi-frame processing (MFP) pipeline having the digital zoom operating on the multiple fused frames.

In a third embodiment, a non-transitory machine readable medium comprises instructions that, when executed by at least one processor of an electronic device, cause the electronic device to receive a first user utterance after a wake-up word for an artificial intelligence (AI) assistant. The instructions, when executed by the at least one processor, also cause the electronic device to feed the first user utterance to a speaker consistency check module configured to perform a speaker verification and a check spoken speed and to an acoustic consistency check module configured to perform an audio energy check and a signal-to-noise ratio (SNR) estimation. The instructions, when executed by the at least one processor, also cause the electronic device to save first outputs from the speaker consistency check module and the acoustic consistency check module. The instructions, when executed by the at least one processor, also cause the electronic device to receive a second user utterance after the first user utterance within a selected period of time. The instructions, when executed by the at least one processor, also cause the electronic device to feed the second user utterance to the speaker consistency check module and the acoustic consistency check module. The instructions, when executed by the at least one processor, also cause the electronic device to provide the first outputs from the speaker consistency check module and the acoustic consistency check module and second outputs from the speaker consistency check module and the acoustic consistency check module to a results fusion module to generate a result. The instructions, when executed by the at least one processor, also cause the electronic device to determine whether the second user utterance is intended for the AI assistant, based at least in part on the result from the result fusion module.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 10A, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

To solve the problems arising from lens FOV limitations preventing post capture zoom out and inhibiting the image quality of post capture zoom in, the present disclosure captures images using more than one image sensor simultaneously, in turn allowing the photographer to zoom in or out using an application that runs on the mobile device. The resulting image is created using a combination of MFP technology and super-resolution technology. In this disclosure, the terms "sensor" and "lens" are used interchangeably.

Figure 1:
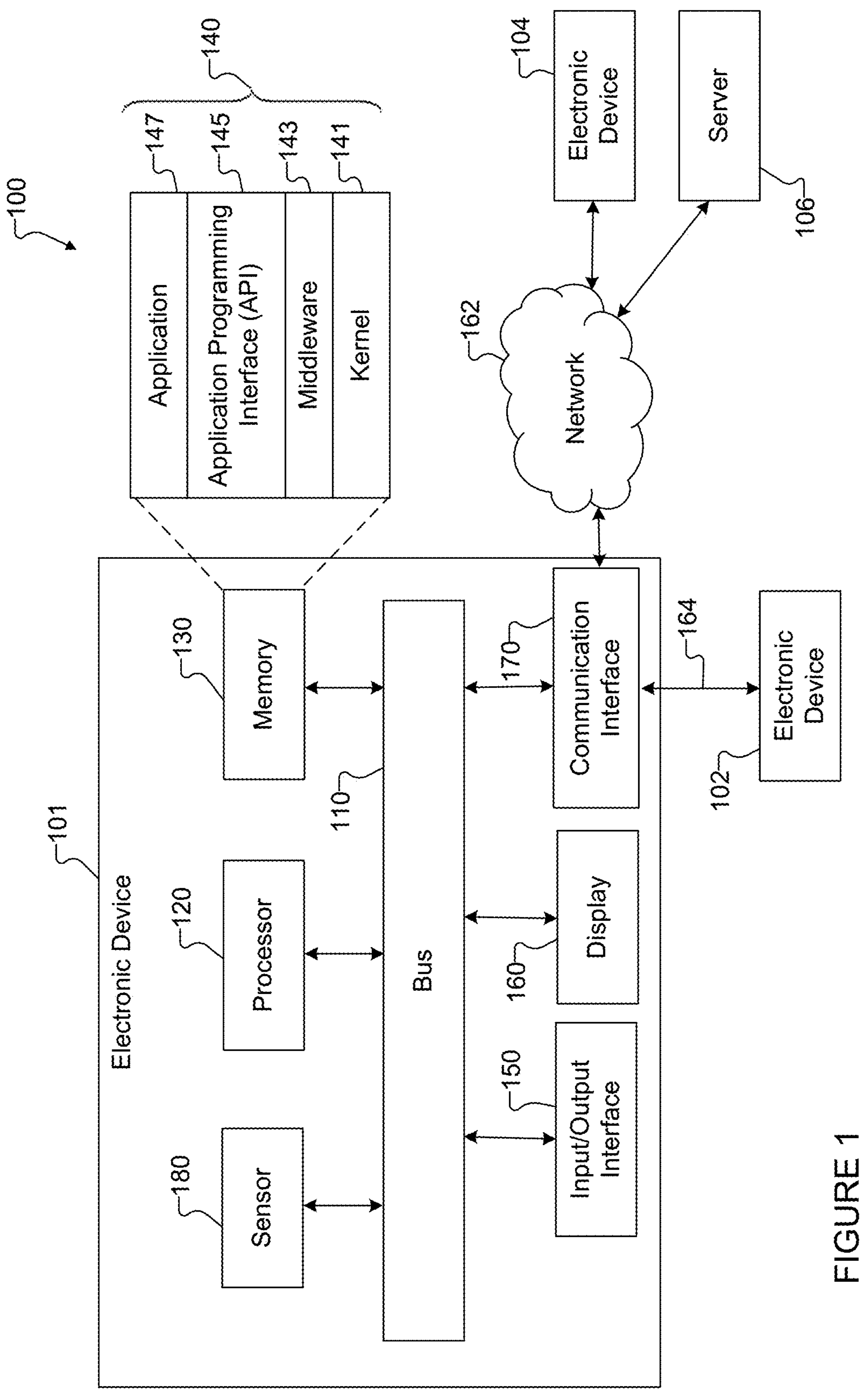
FIG. 1 illustrates an example network configuration which may be employed in conjunction with synchronized multi-lens, multi-frame image capture and post-capture editing in accordance with this disclosure.

FIG. 1 illustrates an example network configuration which may be employed in conjunction with synchronized multi-lens, multi-frame image capture and post-capture editing in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to synchronized multi-lens, multi-frame image capture and post-capture editing.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to synchronized multi-lens, multi-frame image capture and post-capture editing. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as a head mounted display (or "HMD")). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, which include one or more imaging sensors, or a VR or XR headset.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to synchronized multi-lens, multi-frame image capture and post-capture editing.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
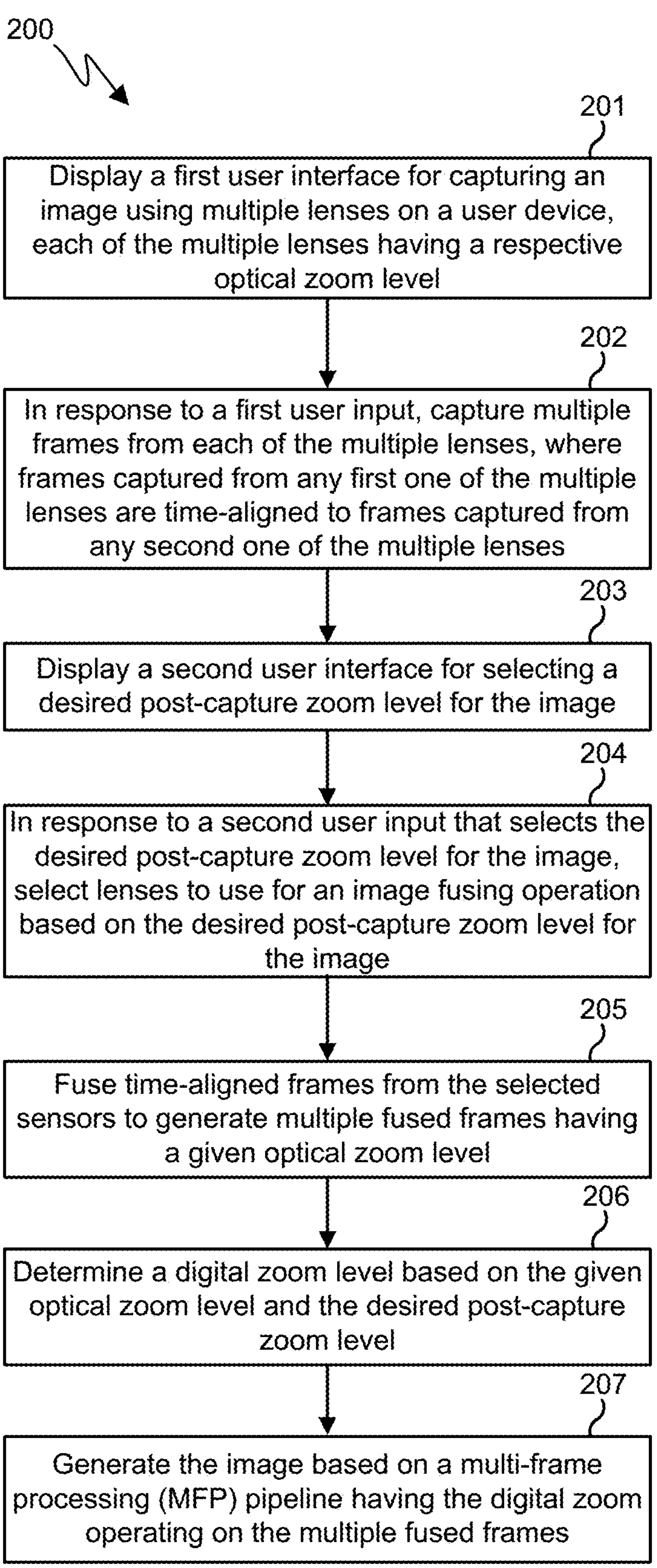
FIG. 2 illustrates an example process of synchronized multi-lens, multi-frame image capture and post-capture editing in accordance with this disclosure.

FIG. 2 illustrates an example process 200 of synchronized multi-lens, multi-frame image capture and post-capture editing in accordance with this disclosure. For ease of explanation, the process 200 of FIG. 2 is described as being performed using the electronic device 101 in the network configuration 100 of FIG. 1. However, the process 200 may be performed using any other suitable device(s) and in any other suitable system(s).

Figure 3:
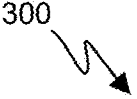
FIG. 3 and FIG. 3A respectively illustrate a user interface for use in synchronized multi-lens, multi-frame image capture and post-capture editing in accordance with this disclosure, and an exemplary sensor arrangement on an electronic device employed to capture the image displayed on the user interface.
Figure 3:
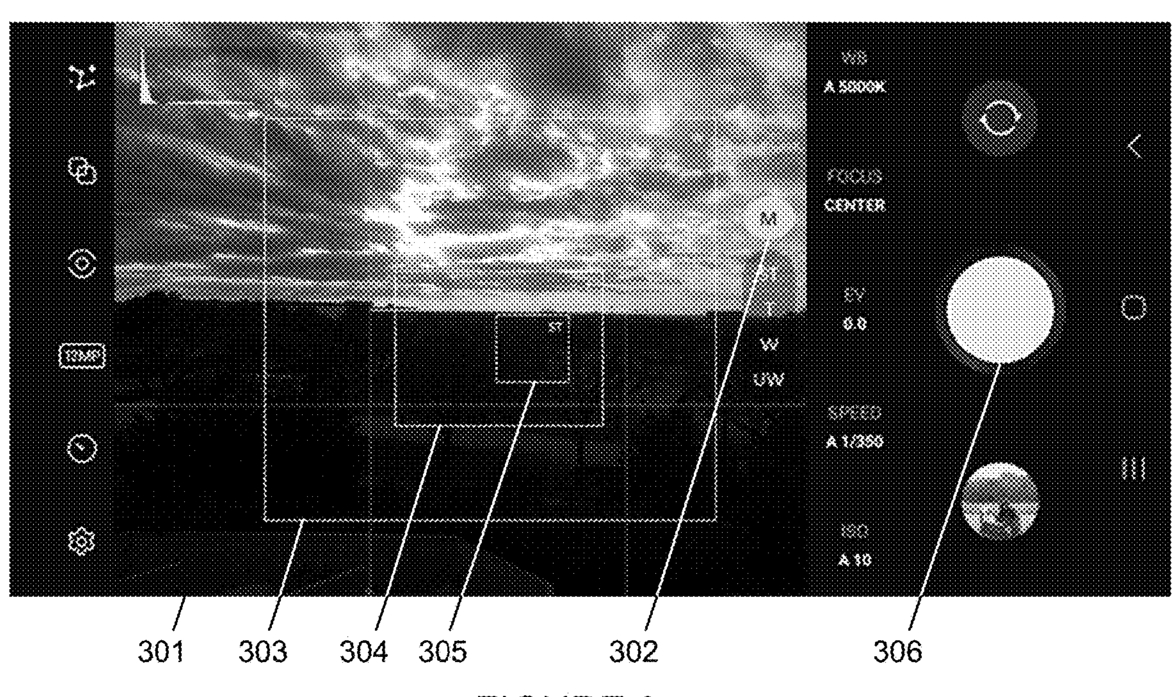
Figure 5:
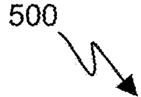
FIG. 5 illustrates a user interface 500 for post-capture zoom selection in synchronized multi-lens, multi-frame image capture and post-capture editing in accordance with this disclosure.
Figure 5:
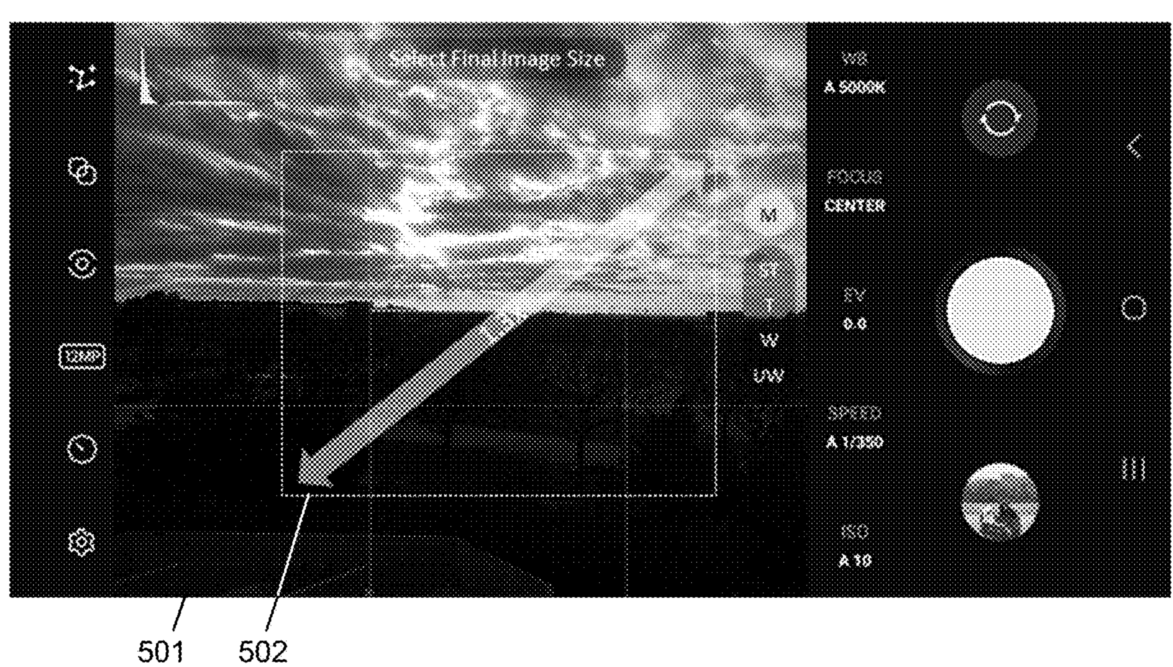

As shown in FIG. 2, the process 200 begins with displaying a first user interface for capturing an image using multiple lenses on a user device, each of the multiple lenses having a respective optical zoom level (step 201). The user interface may be superimposed on an image with the largest field of view, and may include markings corresponding to the different fields of view captures by the multiple lenses (e.g., as shown in FIG. 3). In response to a first user input, multiple frames are captured from each of the multiple lenses (step 202), where the frames captured from any first one of the multiple lenses are time-aligned to frames captured from any second one of the multiple lenses. In some instances, the frames may include (relatively) short, medium, and long frames, and may include multiple sequential instances of the long frames. A second user interface for selecting a desired post-capture zoom level for the image is displayed (step 203). The second user interface may allow the user to draw a bounding ox (e.g., as shown in FIG. 5). In response to a second user input that selects the desired post-capture zoom level for the image, lenses are selected to use for an image fusing operation based on the desired post-capture zoom level for the image (step 204). For example, the next-smallest optical zoom from the user-selected zoom level and each greater zoom level may be selected. Time-aligned frames from the selected sensors are fused to generate multiple fused frames having a given optical zoom level (step 205).

A digital zoom level, based on the given optical zoom level and the desired post-capture zoom level, is determined (step 206). The digital zoom applied may be proportional to the user-selected zoom level and the optical zoom level. The final image is generated based on a multi-frame processing (MFP) pipeline having the digital zoom operating on the multiple fused frames (step 207). The MFP pipeline may include demosaicing, noise filtering, sharpening, and tone mapping.

Although FIG. 2 illustrates one example of a process 200 of synchronized multi-lens, multi-frame image capture and post-capture editing, various changes may be made to FIG. 2. For example, while shown as a series of steps, various steps in FIG. 2 could overlap, occur in parallel, occur in a different order, or occur any number of times (including zero times).

Figure 3A:
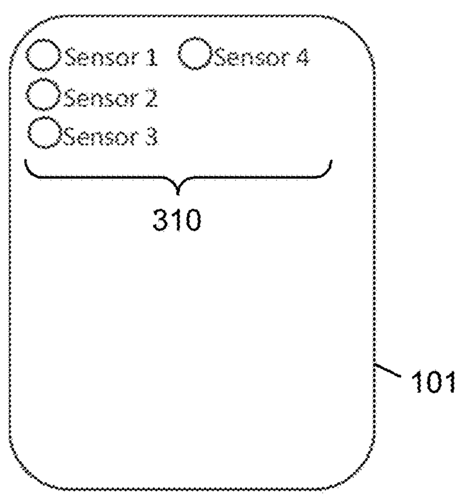

FIG. 3 and FIG. 3A respectively illustrate a user interface 300 for use in synchronized multi-lens, multi-frame image capture and post-capture editing in accordance with this disclosure, and an exemplary sensor arrangement 310 on an electronic device 101 employed to capture the image displayed on the user interface 300. For ease of explanation, the user interface 300 of FIG. 3 is described as being displayed using the electronic device 101 in the network configuration 100 of FIG. 1. However, the user interface 300 may be displayed using any other suitable device(s) and in any other suitable system(s).

As shown in FIG. 3, the user interface 300 may, by default, display an image corresponding to the largest field of view 301 associated with any image sensor. Each image sensor has a respective optical zoom level. For example, the image sensors can include an ultrawide (UW) lens, a wide (W) lens, a telephoto (T) lens, and a super-telephoto (ST) lens, each having a respective optical zoom level. As depicted in FIG. 3A, the exemplary electronic device 101 includes four image sensors: sensor 1 (e.g., 0.6× zoom), sensor 2 (e.g., 1× zoom), sensor 3 (e.g., 3× zoom), and sensor 4 (e.g., 5× zoom). In the absence of the user selecting a field of view of zoom level, the user interface 300 thus may default to displaying the image that will be captured using the image sensor among sensors 1 through 4 that has the largest field of view.

The user interface 300 also includes a multi-lens mode selection icon 302 that allows a user to select a multi-sensor mode (i.e., where a sequence of frames will be captured by each selected image sensor within sensors 1 through 4) as opposed to a single image sensor mode (i.e., where a sequence of frames will be captured by only one of sensors). Actuation of the multi-lens mode selection icon 302 may cause indications 303, 304 and 305 to be displayed (e.g., dotted lines superimposed onto the scene image displayed on the user interface 300) that show the field of view for each of the remaining image sensors—that is, those with smaller fields of view than the scene image displayed. The user interface 300 also includes a capture button 306 that can be used to trigger the image sensors to capture images based on the mode selected by the multi-lens mode selection icon 302.

Although FIG. 3 illustrates one example of a user interface 300 for use in synchronized multi-lens, multi-frame image capture and post-capture editing, various changes may be made to FIG. 3. For example, while a single multi-lens/sensor mode selection control is shown, multiple sensor mode controls could be provided allowing the user to activate all sensors or permutations of individual sensors together (e.g., sensor 1 and sensor 4 only, or the combination of sensor 2, sensor 3, and sensor 4). For instance, the dotted lines in the example of FIG. 3 may be user controls that, when touched, select the corresponding image sensor as well as the image sensor corresponding to the scene image displayed.

Figure 4:
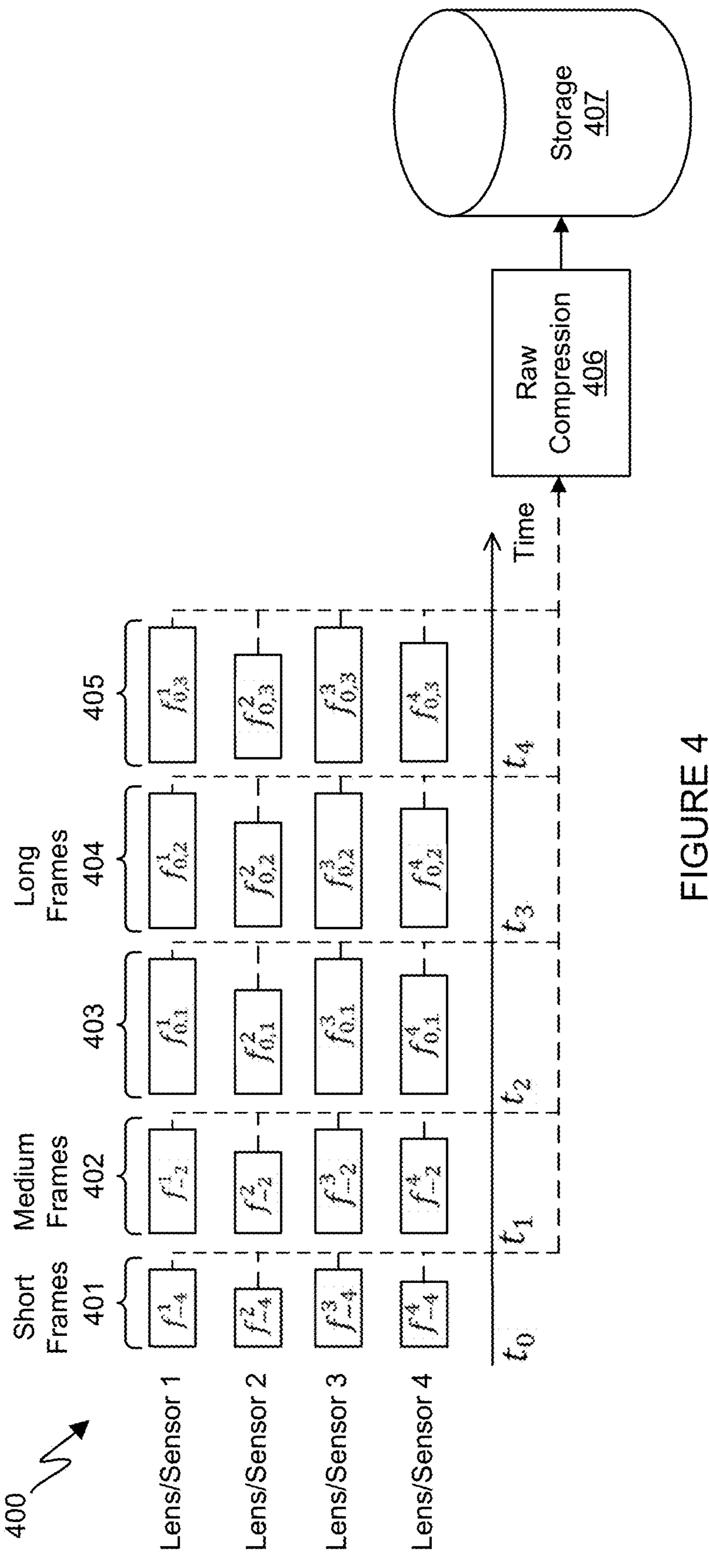
FIG. 4 illustrates an MFP capture sequence for synchronized multi-lens, multi-frame image capture and post-capture editing in accordance with this disclosure.

FIG. 4 illustrates an MFP capture sequence 400 for synchronized multi-lens, multi-frame image capture and post-capture editing in accordance with this disclosure. For ease of explanation, the MFP capture sequence 400 of FIG. 4 is described as being performed using the electronic device 101 in the network configuration 100 of FIG. 1. However, the MFP capture sequence 400 may be performed using any other suitable device(s) and in any other suitable system(s).

For multi-lens, high dynamic range (HDR) photography, image captures are synchronized in time and brightness/exposure as shown in FIG. 4. A short frame 401 is captured for each of image sensors 1 through 4 at time $t_0$; a medium frame 402 is captured for each of image sensors 1 through 4 at time $t_1$; and a set of long frames 403, 404, and 405 are captured for each of image sensors 1 through 4 at times $t_2$, $t_3$, and $t_4$, respectively. In FIG. 4, the short frames 401 and the medium frames 402 are labeled $$f_{EV}^{s},$$

indicating a frame at exposure EV from sensor s, while the long frames 403, 404, and 405 are labeled $$f_{n,EV}^{s},$$

indicating the nth frame at exposure EV from sensor s.

Note that similar exposure for objects in frames from different sensors is important to ensure seamless concatenation. As a result, the exposure for "exposure aligned" images in frames 401 through 405 may be different, to obtain the same quantity of photons from the scene at similar signal to noise ratio (SNR), Image sensors 1 through 4 may need to be exposed for different amounts of times due to aperture differences, differences in pixel size, etc. Accordingly, FIG. 4 shows differing durations for different sensors at a given time, ensuring that each sensor triggered at a given time gets approximately the same quantity of photons to create the frame. The captured RAW image frames are then compressed by RAW compression 406 using currently known compression methods, and then saved in storage 407 for later processing. Although the compressed frames are shown as being saved, the frames may alternatively be sent directly to MFP processing.

Although FIG. 4 illustrates one example of an MFP capture sequence 400 of synchronized multi-lens, multi-frame image capture and post-capture editing, various changes may be made to FIG. 4. For example, more or fewer frames could be captured for any of the short frames, the medium frames, or the long frames.

FIG. 5 illustrates a user interface 500 for post-capture zoom selection in synchronized multi-lens, multi-frame image capture and post-capture editing in accordance with this disclosure. For ease of explanation, the user interface 300 of FIG. 3 is described as being displayed using the electronic device 101 in the network configuration 100 of FIG. 1. However, the user interface 500 may be displayed using any other suitable device(s) and in any other suitable system(s).

Once the image frames depicted in FIG. 4 are captured, the largest field of view captured is displayed and the user is prompted, via user interface control 501, to select the "post-capture" zoom level—that is, select the region of the capture image that the user wishes to employ. The user can interact with the screen to select a post-capture zoom level.

Although FIG. 5 illustrates one example of a user interface 500 for post-capture zoom selection, various changes may be made to FIG. 5. For example, post-capture zoom selection recommendations may be displayed for the user based on feature recognition within the captured frames.

Figure 6:
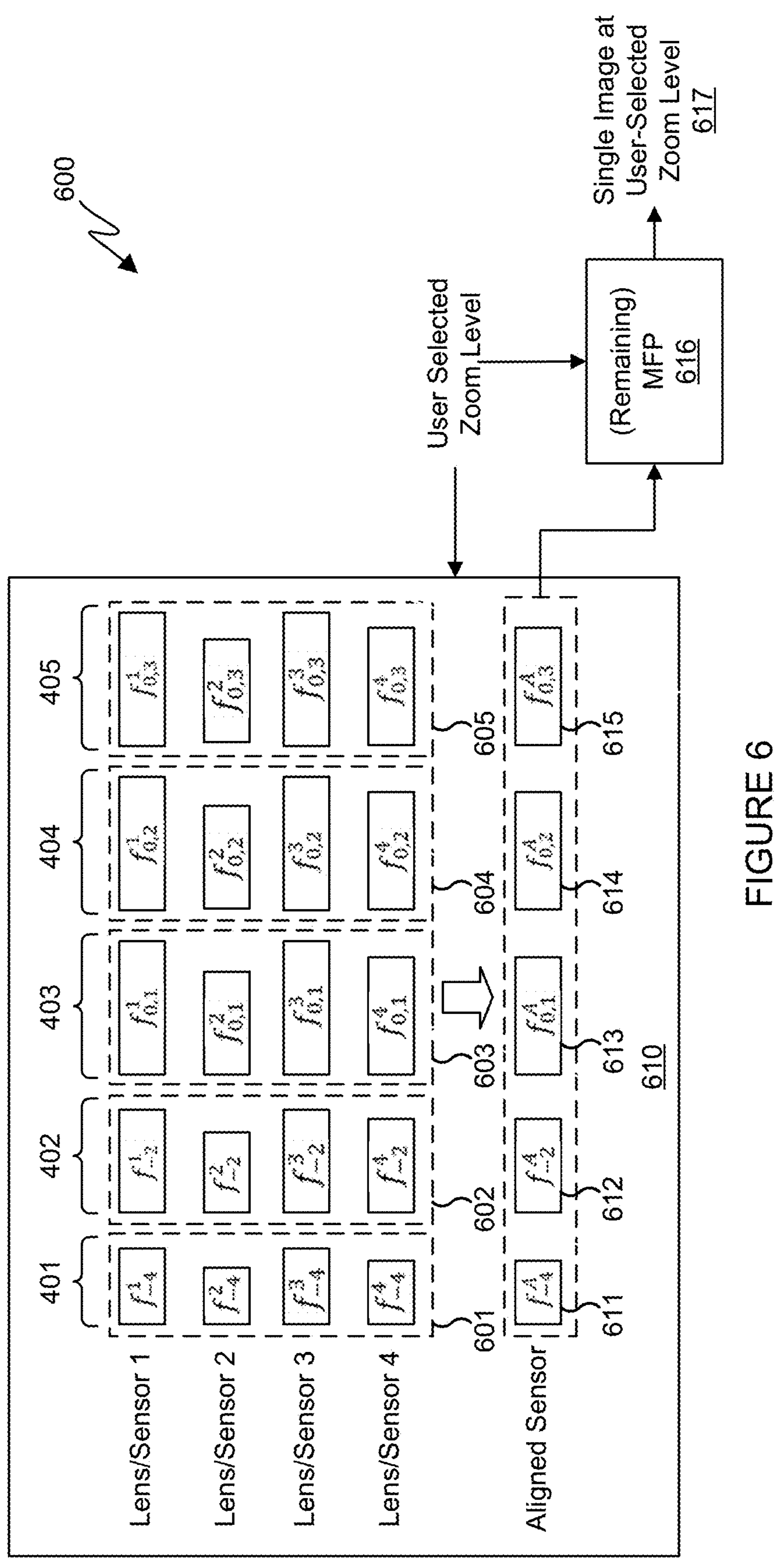
FIG. 6 illustrates a process of image frame alignment and generation of a final image for synchronized multi-lens, multi-frame image capture and post-capture editing in accordance with this disclosure.

FIG. 6 illustrates a process 600 of image frame alignment and generation of a final image for synchronized multi-lens, multi-frame image capture and post-capture editing in accordance with this disclosure. For ease of explanation, the process 600 of FIG. 6 is described as being performed using the electronic device 101 in the network configuration 100 of FIG. 1. However, the process 600 may be performed using any other suitable device(s) and in any other suitable system(s).

Based on user's selection of a particular zoom level as described in connection with FIG. 5, the camera executes post-capture image sequence alignment and generates final image for the user. A set of time and exposure aligned multi-lens frames, such as image frames 401, 402, 403, 404, and 405 depicted in FIG. 4, are first aligned, using pre-calibrated alignment block 610. The calibration may be performed pre-capture, as sensor alignment is fixed on the electronic device 101. Then, the user-specified zoom level is used to select which sensor(s) to use for the multi-lens frame alignment. Once the sensors are selected, the frames from the selected sensors at each time instant are fused. For example, in the case where all sensors are selected, the image frames 401, 402, 403, 404, and 405 are employed to generate respective aligned frames 611, 612, 613, 614, and 615. Specifically, all frames that belong to a column in FIG. 6 are aligned to create one single frame: the image frames in column 601 are aligned to form image frame 611; the image frames in column 602 are aligned to form image frame 612; the image frames in column 603 are aligned to form image frame 613; the image frames in column 604 are aligned to form image frame 614; and the image frames in column 605 are aligned to form image frame 615. These aligned frames 611 through 615 are at the lowest optical zoom level of the selected sensors. The aligned frames 611 through 615 are passed to MFP pipeline 616 (described in further detail below) to generate a single image 617 at the user selected zoom. The user-selected zoom level, as well as the lowest optical zoom level of the selected sensors, is used by MFP pipeline 616 to determine the digital zoom to be applied in the MFP pipeline 616.

In selecting sensors to align based on user-selected zoom level, the user-selected zoom level is utilized to choose which frames are aligned. In general, based on the user-selected zoom level, all sensors having an optical zoom level higher than the user-selected zoom level are used. The sensor whose optical zoom level is less than and closest to the user-selected zoom level is also used. For example, if image sensor 1=0.6× optical zoom, image sensor 2=1× optical zoom, image sensor 3=3× optical zoom, and image sensor 4=5× optical zoom:

Case 1: if 0×<user selected zoom level<1×, then use frames from all four sensors;

Case 2: if 1×<user selected zoom level<3×, then use frames from only 1×, 3×, and 5× sensors;

Case 3: if 3×<user selected zoom level<5×, then use frames from only 3× and 5× sensors; and Case 4: if 5×<user selected zoom level, then use frame from only 5× sensor.

To fuse frames from the selected sensors, once the sensors are selected, the frames from the selected sensors at each time instant are fused. In the example of FIG. 6, when all four image sensors 1 through 4 are being used, frames $$f^1_{-4}, f^2_{-4}, f^3_{-4}, \text{ and } f^4_{-4}$$

are fused to generate fused frame $$f^A_{-4}; \text{ frames } f^1_{-2}, f^2_{-2}, f^3_{-2}, \text{ and } f^4_{-2}$$

are fused to generate fused frame $$f^A_{-2}; \text{ frames } f^1_{0,1}, f^2_{0,1}, f^3_{0,1}, \text{ and } f^4_{0,1}$$

are fused to generate fused frame $$f^A_{0,1}; \text{ frames } f^1_{0,2}, f^2_{0,2}, f^3_{0,2}, \text{ and } f^4_{0,2}$$

are fused to generate fused frame $$f^A_{0,2}; \text{ frames } f^1_{0,3}, f^2_{0,3}, f^3_{0,3}, \text{ and } f^4_{0,3}$$

are fused to generate fused frame $$f^A_{0,3}.$$

In other situations (e.g., Case 3 above), only frames $$f^3_{-4} \text{ and } f^4_{-4}$$

are fused to generate fused frame $$f^A_{-4},$$

etc.

The resultant fused frame for each time instant is at the lowest optical zoom level of the selected sensors. Existing techniques may be employed to align frames from different sensors. While standard techniques typically involve fusing two frames from different sensors, such techniques can be easily extended to multiple sensors by aligning two frames at a time. For example, aligning a frame from image sensor 1 and a frame from image sensor 2 produces an intermediate result, and then the intermediate result is further aligned with a frame from image sensor 3, and so on.

Although FIG. 6 illustrates one example of a process 600 for image frame alignment and generation of a final image, various changes may be made to FIG. 6. For example, fewer frames could be utilized based on the user-selected zoom level, instead of the frame having an optical zoom level just below the user-selected zoom level and all frames having a higher optical zoom level.

Figure 7:
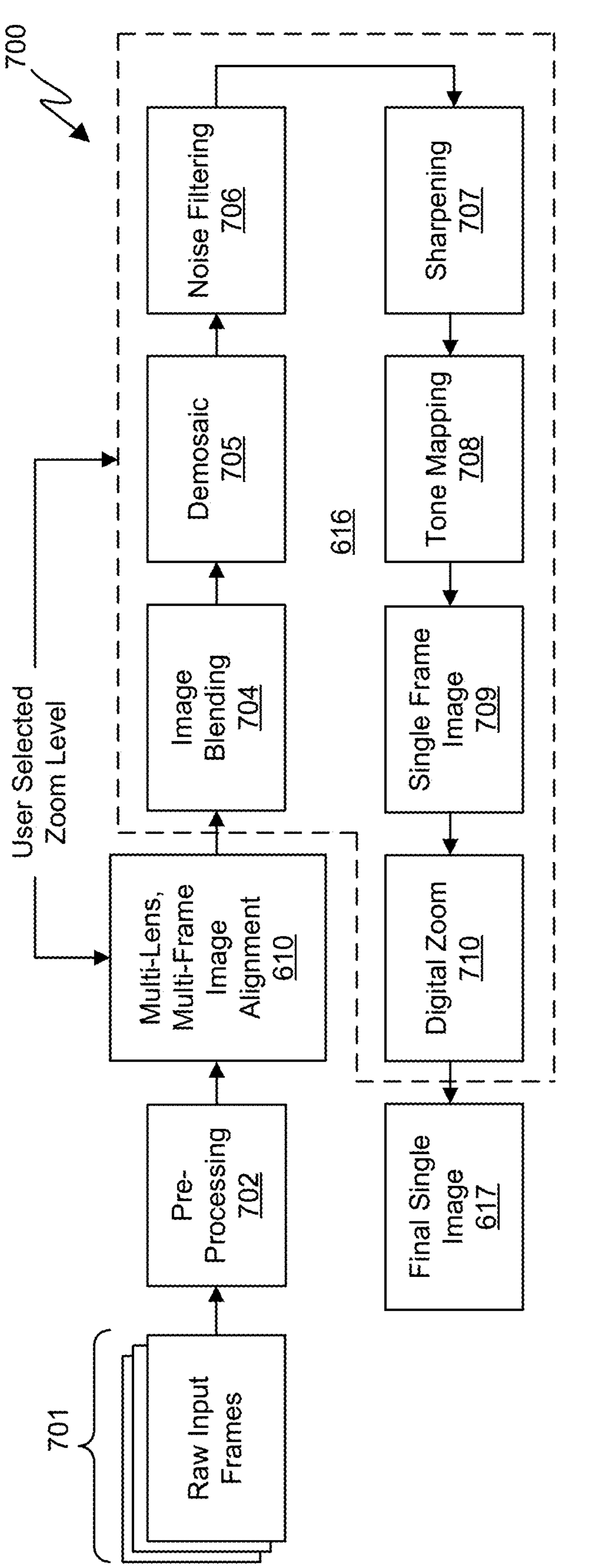
FIG. 7 illustrates an example MFP pipeline for synchronized multi-lens, multi-frame image capture and post-capture editing in accordance with this disclosure.

FIG. 7 illustrates an example MFP pipeline 700 for synchronized multi-lens, multi-frame image capture and post-capture editing in accordance with this disclosure. For ease of explanation, the MFP pipeline 700 of FIG. 7 is described as being used by the electronic device 101 in the network configuration 100 of FIG. 1. However, the MFP pipeline 700 may be used by any other suitable device(s) and in any other suitable system(s).

As shown in FIG. 7, the MFP pipeline 700 receives a set of one or more raw input frames 701, preferably a set of image frames such as frames 401, 402, 403, 404, and 405 as depicted in FIG. 4. The received image frames 701 undergo pre-processing 702, which may include operations such as lens shading correction, white balance, and the like. Image frame alignment 703 aligns multiple frames from the received frames so that the aligned frames can be blended together. Image blending 704 operates on the output of image frame alignment 703, blending aligned frames to create one image. Demosaic 705 interpolates pixels in the single image output by image blending 704, to supply missing color channels. Noise filter 706 filters the noise and image sharpening 707 increase the contrast of pixels to accentuate edges. Tone mapping 708 multiplies different pixels in the image a gain factor, to ensure the entire image displays well. The single, fused frame 709 output by tone mapping 708 has a zoom applied by digital zoom 710 based on the user-selected zoom level, to produce the final single image 711.

In the present disclosure, since the input to the MFP pipeline 700 is a collection of frames at the lowest optical zoom level of the selected sensors, the single, fused frame 709 before the digital zoom 710 is also applied at the lowest optical zoom level of the selected sensors. The digital zoom 710 applied to the single, fused frame 709 should magnify the single, fused frame 709 from the lowest optical zoom level of the selected sensors to the user-selected zoom level. In this regard, the digital zoom to be applied in the MFP pipeline 700 is calculated in a manner such as: digital zoom=user-selected zoom level/optical zoom level of input frames to the MFP pipeline 700.

Although FIG. 7 illustrates one example of an MFP pipeline 700 for synchronized multi-lens, multi-frame image capture and post-capture editing in accordance with this disclosure, various changes may be made to FIG. 7. For example, various blocks may be combined or interconnected so that pipelined or real time performance is improved.

Figure 8:
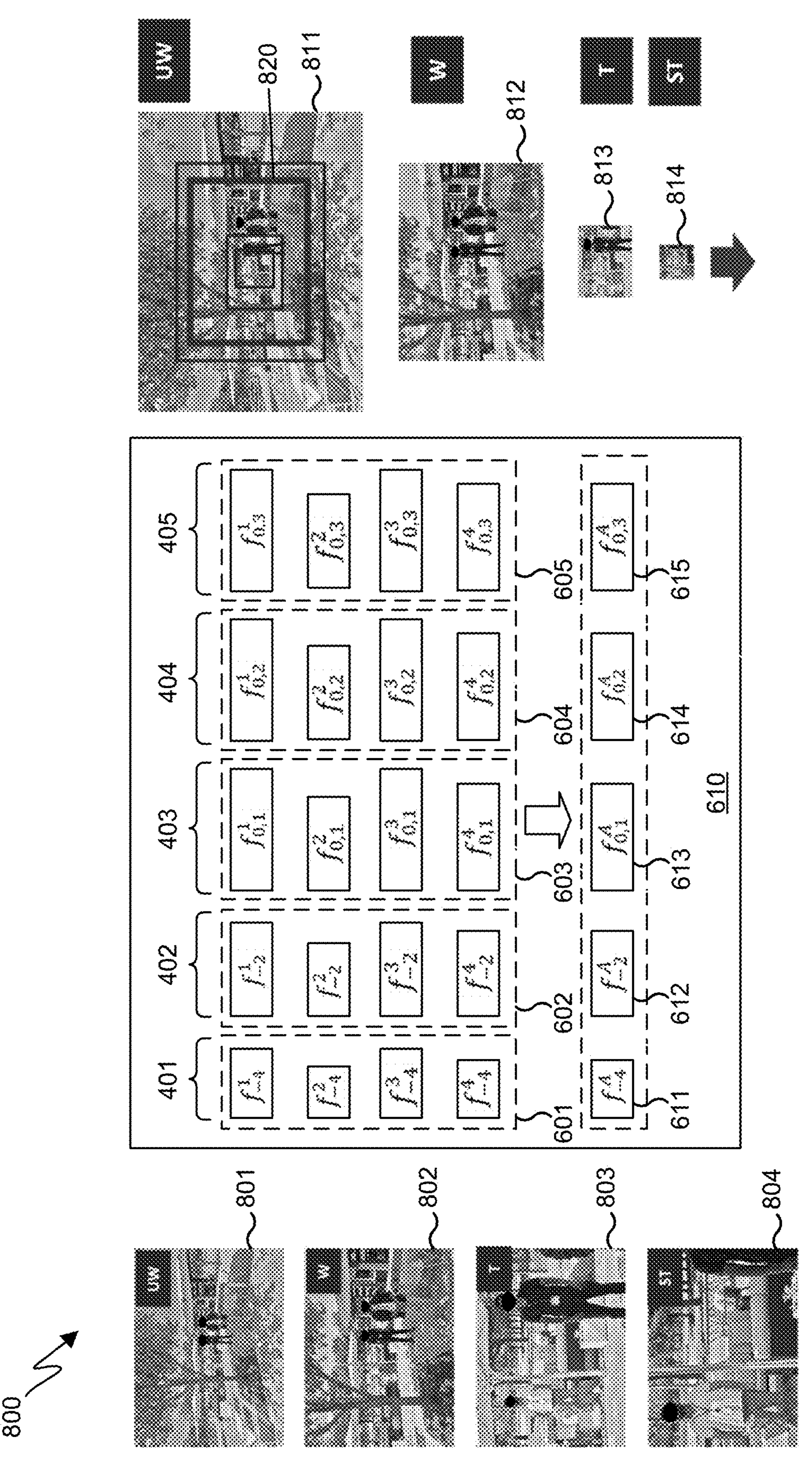
FIG. 8 illustrates multi-lens alignment as described in connection with FIG. 6, using example images.

FIG. 8 illustrates multi-lens alignment as described in connection with FIG. 6, using example images. In the example 800 of FIG. 8, image sensors/lenses are employed to capture a UW image 801, a W image 802, a T image 803, and an ST image 804. The black boxes within image 811 show where each capture from each lens belongs in the overall FOV, and image 812, 813, and 814 respectively depict the relative portion of the overall field of view capture by the W image 802, the T image 803, and the ST image 804 (albeit at increasing levels of resolution). The box 820 illustrates the user-selected zoom level. For that user-selected zoom level, the W image 802, the T image 803, and the ST image 804 are employed to generate the final single image.

Figure 9:
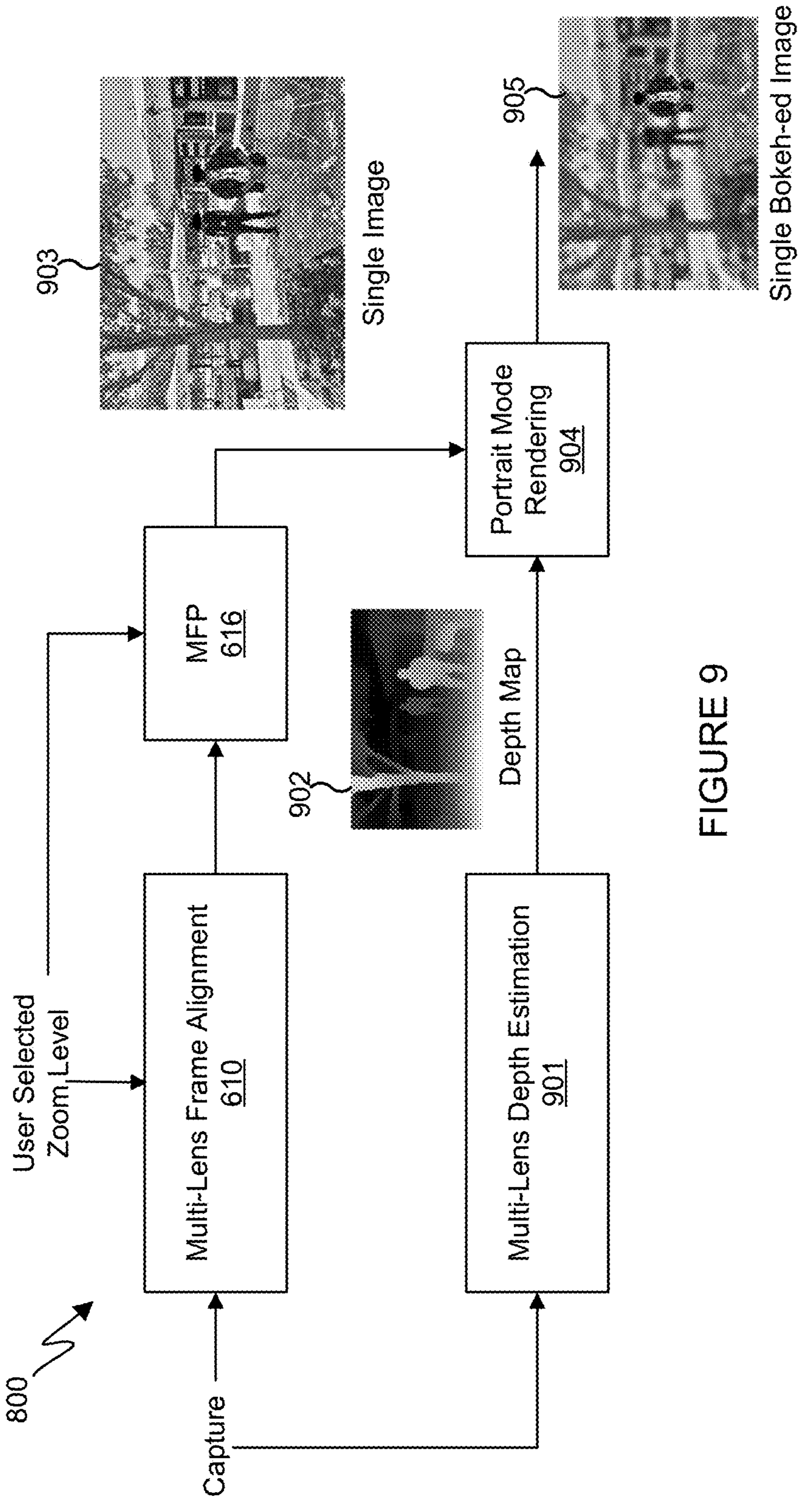
FIGS. 9 and 9A-9B illustrate an example process of creating a single bokeh-ed image with synchronized multi-lens, multi-frame image capture and post-capture editing in accordance with this disclosure.
Figure 9A:
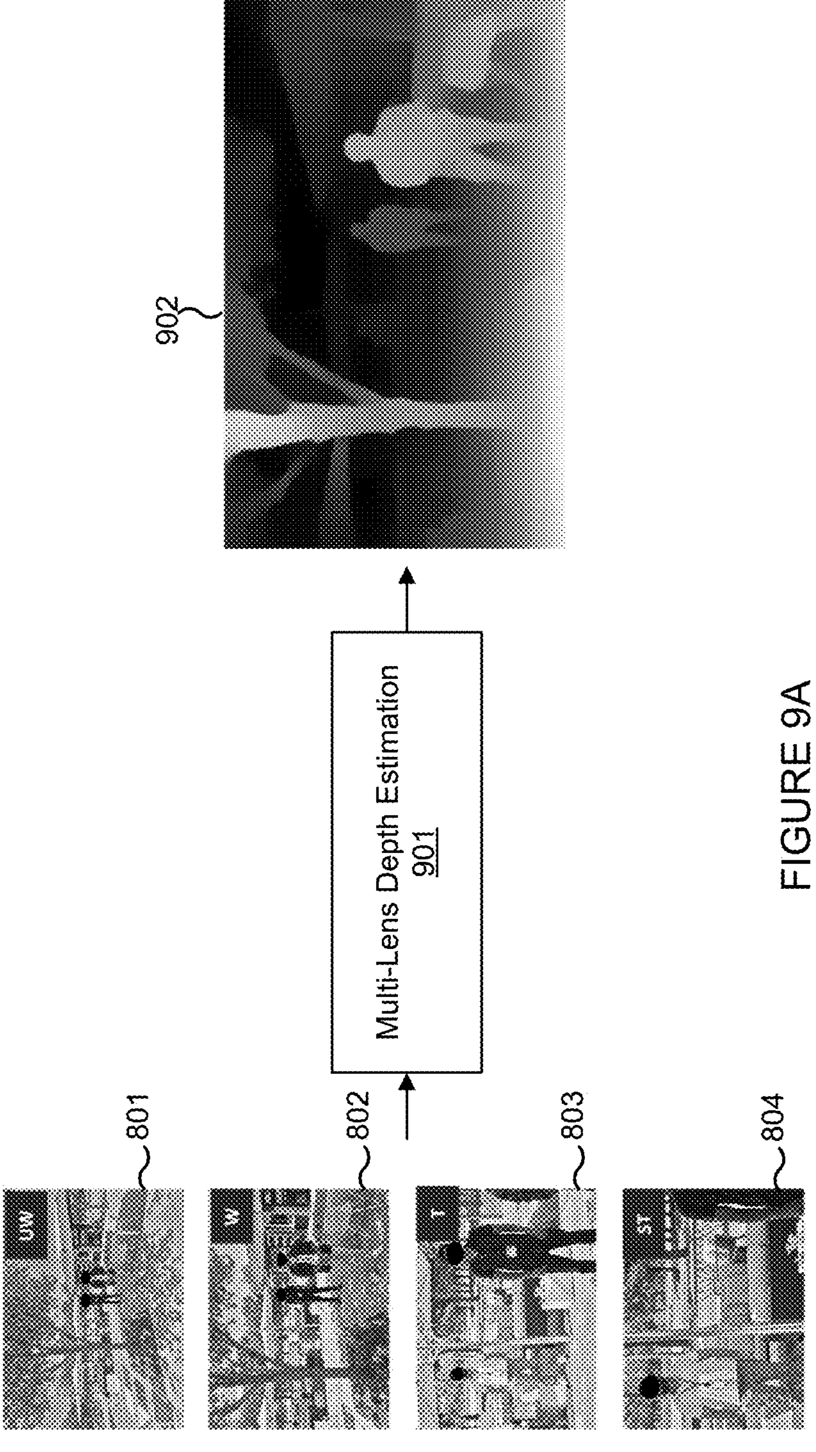
Figure 9B:
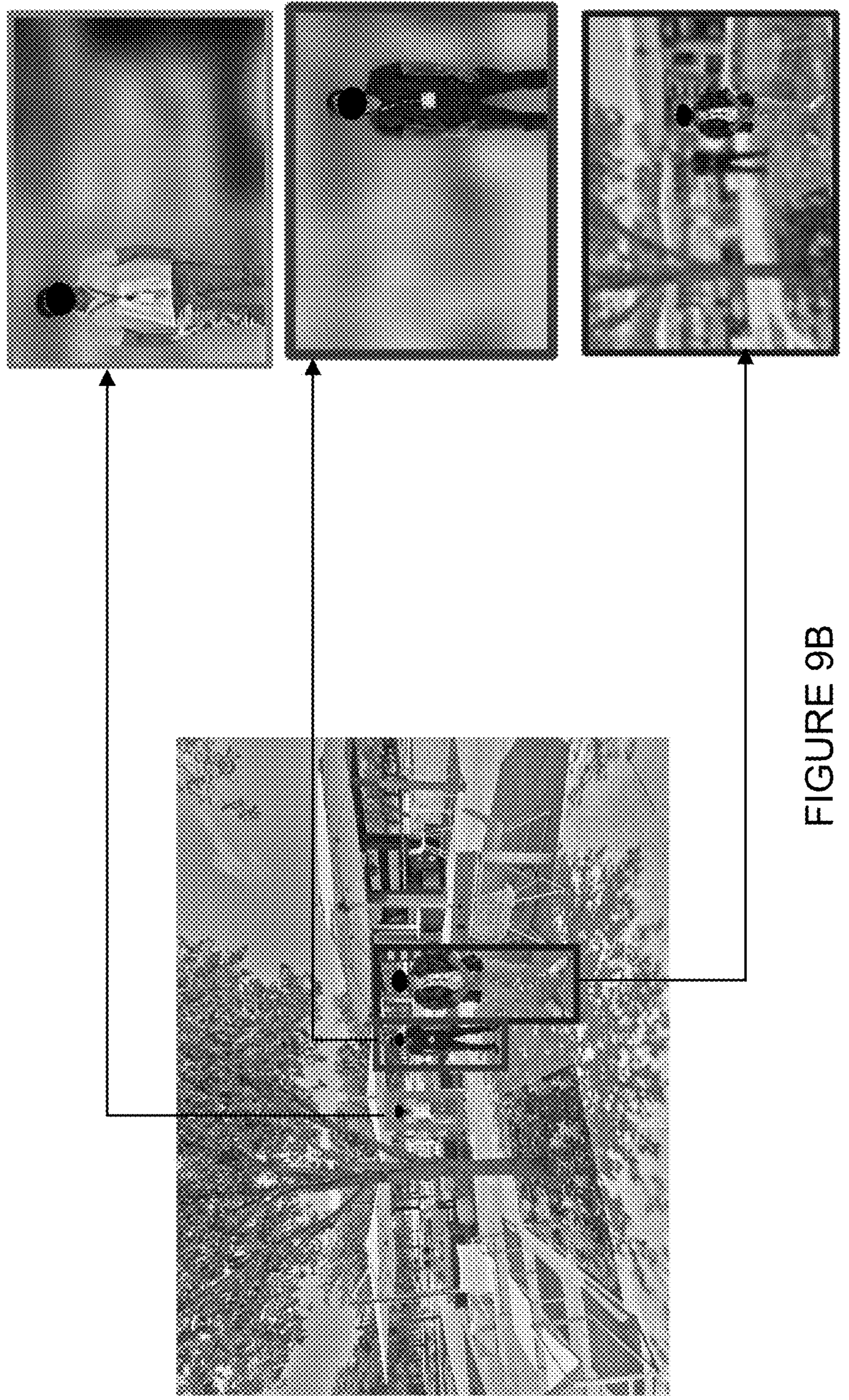

FIGS. 9 and 9A-9B illustrate an example process 900 of creating a single bokeh-ed image with synchronized multi-lens, multi-frame image capture and post-capture editing in accordance with this disclosure. For ease of explanation, the example process 900 of FIGS. 9 and 9A-9B is described as being performed using the electronic device 101 in the network configuration 100 of FIG. 1. However, the example process 900 may be performed using any other suitable device(s) and in any other suitable system(s).

The final image from the process 600 in FIG. 6 may be employed to create a single bokeh-ed image using post capture bokeh with multi-lens depth estimation. The data from multiple image sensors/lenses can be used for better depth estimation, which in turn can be used for better bokeh effect for portrait mode. The example process 900 employs the exemplary multi-lens capture sequence of FIG. 6, but the input frames (e.g., frames 401, 402, 403, 404, and 405 as depicted in FIG. 4 or, for the example of FIGS. 9 and 9A, the UW image 801, the W image 802, the T image 803, and the ST image 804 in FIG. 8) are also input to multi-lens depth estimation 901. As shown in FIG. 9A, multi-lens depth estimation 901 operates on the captured image frames to produce a depth estimation map 902. Standard techniques may be utilized to estimate depth maps from different the different image sensors/lenses. However, since such techniques usually assume a similar field of view for all sensors while the present disclosure involves capture by different sensors having different fields of view based on the optical zoom levels, a different number of sensors is used for different parts of the scene. For example, data from all the sensors may be utilized for depth estimation at the center of the image frames, while only data from the ultra-wide sensor may be utilized for the outer most part of the scene. Only the available data is utilized to estimate the depth. Image frames from different sensors need to be aligned before depth estimation is performed, but the alignment from image frame alignment 703 in FIG. 7 achieve the necessary result.

Referring back to FIG. 9, the single image 903 output by MFP pipeline 616 may be employed, together with the depth estimation map 902 output by multi-lens depth estimation 901, by portrait mode rendering 904 to produce a single, bokeh-ed image 905. As evident, the focus is softened for subjects within the image to create a bokeh effect accentuating the primary subject of the image.

Multi-lens capture with different fields of view allows—or at least facilitates—portrait mode rendering at different depths. As shown in FIG. 9B, the user may be allowed to select multiple subjects within the capture frame(s) to have in sharp focus, with the remaining background having bokeh effect for portrait mode. The subjects may be at different distances from the image sensors/lenses, and still render in sharp focus with the background having bokeh.

Although FIGS. 9 and 9A-9B illustrate one example of process 900 for creating a single bokeh-ed image in accordance with this disclosure, various changes may be made to FIGS. 9 and 9A-9B. For example, various blocks may be combined or interconnected so that pipelined or real time performance is improved.

Figure 10:
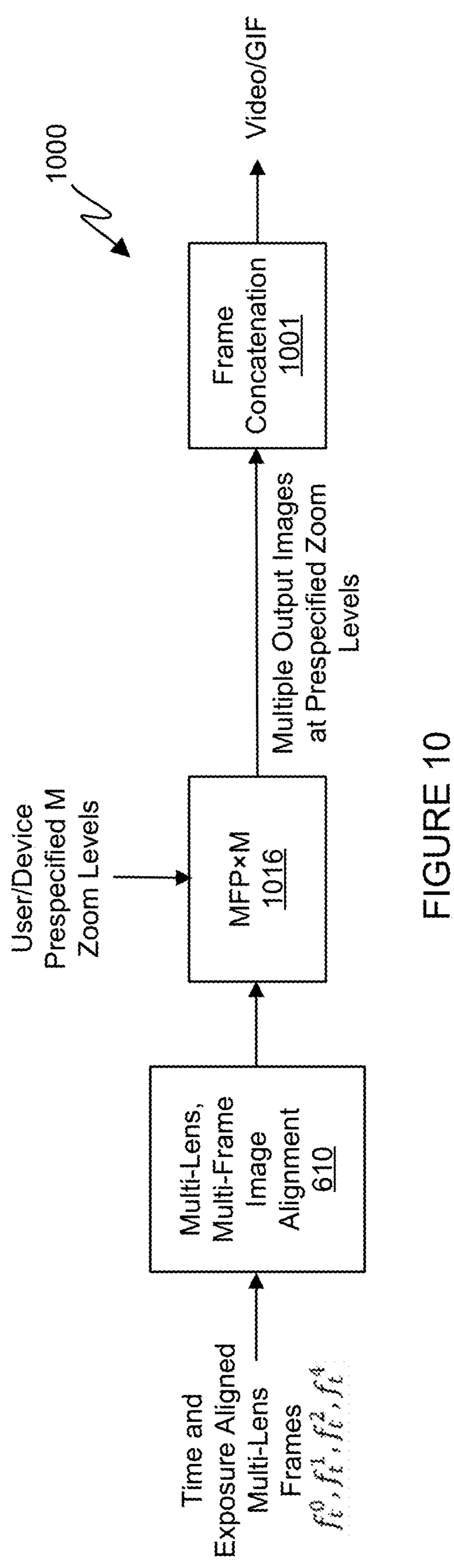
FIGS. 10 and 10A illustrate an example process of creating an animation with synchronized multi-lens, multi-frame image capture and post-capture editing in accordance with this disclosure.
Figure 10A:
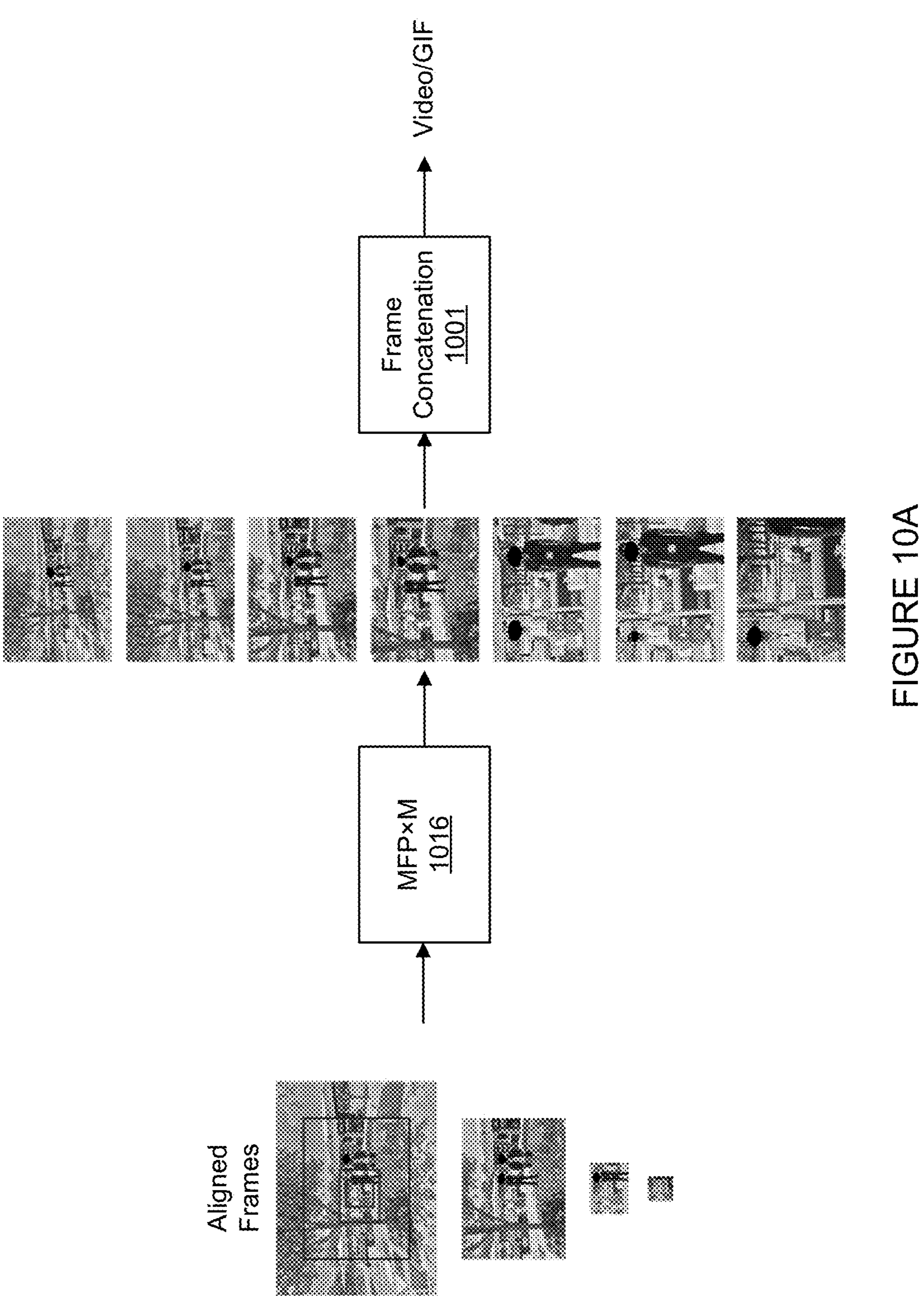

FIGS. 10 and 10A illustrate an example process 1000 of creating an animation with synchronized multi-lens, multi-frame image capture and post-capture editing in accordance with this disclosure. For ease of explanation, the example process 1000 of FIGS. 10 and 10A is described as being performed using the electronic device 101 in the network configuration 100 of FIG. 1. However, the example process 1000 may be performed using any other suitable device(s) and in any other suitable system(s).

The synchronized multi-frame inputs captured as described above may be used to create a graphic interchange format (GIF) or video animation of the zoom process, where intermediate zoom levels are created using the anchor frames (i.e., captured frames). A set of time and exposure aligned multi-lens frames (e.g., image frames 401, 402, 403, 404, and 405) are captured and aligned using alignment block 610. The user may be allowed to specify M zoom levels, or the device may use M prespecified zoom levels. In this case, the process 600 of FIG. 6 is run M times (MFP×M 1016). Because there are M different zoom levels, the entire pipeline is run with each zoom level, to produced M different output images. These M images are then concatenated by frame concatenation 1001 to generate a video or a GIF. FIG. 10A illustrates the process 1000 of FIG. 10, with example images.

It should be noted that the functions shown in the figures or described above can be implemented in an electronic device 101, 102, 104, server 106, or other device(s) in any suitable manner. For example, in some embodiments, at least some of the functions shown in the figures or described above can be implemented or supported using one or more software applications or other software instructions that are executed by the processor 120 of the electronic device 101, 102, 104, server 106, or other device(s). In other embodiments, at least some of the functions shown in the figures or described above can be implemented or supported using dedicated hardware components. In general, the functions shown in the figures or described above can be performed using any suitable hardware or any suitable combination of hardware and software/firmware instructions. Also, the functions shown in the figures or described above can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method of generating an image from a multi-lens, multi-frame capture, comprising:

displaying a first user interface for capturing an image using multiple lenses on a user device, each of the multiple lenses having a respective optical zoom level;

in response to a first user input, capturing multiple frames from each of the multiple lenses, wherein frames captured from any first one of the multiple lenses are time-aligned to frames captured from any second one of the multiple lenses;

displaying a second user interface for selecting a desired post-capture zoom level for the image;

in response to a second user input that selects the desired post-capture zoom level for the image, selecting lenses to use for an image fusing operation based on the desired post-capture zoom level for the image;

fusing time-aligned frames from the selected lenses to generate multiple fused frames having a given optical zoom level;

determining a digital zoom level for a digital zoom based on the given optical zoom level and the desired post-capture zoom level; and generating the image based on a multi-frame processing (MFP) pipeline having the digital zoom operating on the multiple fused frames.

2. The method of claim 1, wherein selecting the lenses to use for an image fusing operation based on the desired post-capture zoom level for the image comprises:

selecting all lenses having an optical zoom level higher than the desired post-capture zoom level; and selecting the lens whose optical zoom level is less than and closest to the desired post-capture zoom level.

3. The method of claim 1, wherein fusing the time-aligned frames from the selected lenses to generate the multiple fused frames having the given optical zoom level comprises:

generating a fused frame for each time instant based on the time-aligned frames from the selected lenses, wherein the given optical zoom level is equal to an optical zoom level that is less than and closest to the desired post-capture zoom level.

4. The method of claim 1, wherein the digital zoom level is equal to the desired post-capture zoom level divided by the given optical zoom level.

5. The method of claim 1, wherein the multiple frames from each of the multiple lenses include frames of a first duration and frames of a second duration longer than the first duration.

6. The method of claim 1, wherein generating the image further comprises performing depth estimation based on frames from each of the multiple lenses.

7. The method of claim 1, wherein generating the image further comprises producing multi-zoom motion by concatenating frames from each of the multiple lenses.

8. An electronic device for use in generating an image from a multi-lens, multi-frame capture, the electronic device comprising:

a display configured to display a first user interface for capturing an image using multiple lenses on a user device, each of the multiple lenses having a respective optical zoom level, wherein the display is configured to display a second user interface for selecting a desired post-capture zoom level for the image;

a plurality of image sensors configured, in response to a first user input, to capture multiple frames from each of the multiple lenses, wherein frames captured from any first one of the multiple lenses are time-aligned to frames captured from any second one of the multiple lenses; and a processor configured, in response to a second user input that selects the desired post-capture zoom level for the image, to:

select lenses to use for an image fusing operation based on the desired post-capture zoom level for the image;

fuse time-aligned frames from the selected lenses to generate multiple fused frames having a given optical zoom level;

determine a digital zoom level for a digital zoom based on the given optical zoom level and the desired post-capture zoom level; and generate the image based on a multi-frame processing (MFP) pipeline having the digital zoom operating on the multiple fused frames.

9. The electronic device of claim 8, wherein the processor, in selecting the lenses to use for an image fusing operation based on the desired post-capture zoom level for the image, is configured to:

select all lenses having an optical zoom level higher than the desired post-capture zoom level; and select the lens whose optical zoom level is less than and closest to the desired post-capture zoom level.

10. The electronic device of claim 8, wherein the processing, in fusing the time-aligned frames from the selected lenses to generate the multiple fused frames having the given optical zoom level, is configured to:

generate a fused frame for each time instant based on the time-aligned frames from the selected lenses, wherein the given optical zoom level is equal to an optical zoom level that is less than and closest to the desired post-capture zoom level.

11. The electronic device of claim 8, wherein the digital zoom level is equal to the desired post-capture zoom level divided by the given optical zoom level.

12. The electronic device of claim 8, wherein the multiple frames from each of the multiple lenses include frames of a first duration and frames of a second duration longer than the first duration.

13. The electronic device of claim 8, wherein the processor is further configured to:

perform depth estimation based on frames from each of the multiple lenses in generating the image.

14. The electronic device of claim 8, wherein the processor is further configured to:

produce multi-zoom motion by concatenating frames from each of the multiple lenses in generating the image.

15. A non-transitory machine readable medium comprising instructions that, when executed by at least one processor of an electronic device, cause the electronic device to:

display a first user interface for capturing an image using multiple lenses on a user device, each of the multiple lenses having a respective optical zoom level;

in response to a first user input, capture multiple frames from each of the multiple lenses, wherein frames captured from any first one of the multiple lenses are time-aligned to frames captured from any second one of the multiple lenses;

display a second user interface for selecting a desired post-capture zoom level for the image;

in response to a second user input that selects the desired post-capture zoom level for the image, select lenses to use for an image fusing operation based on the desired post-capture zoom level for the image;

fuse time-aligned frames from the selected lenses to generate multiple fused frames having a given optical zoom level;

determine a digital zoom level for a digital zoom based on the given optical zoom level and the desired post-capture zoom level; and generate the image based on a multi-frame processing (MFP) pipeline having the digital zoom operating on the multiple fused frames.

16. The non-transitory machine readable medium of claim 15, further comprising instructions that, when executed by the at least one processor, cause the electronic device to:

select all lenses having an optical zoom level higher than the desired post-capture zoom level; and select the lens whose optical zoom level is less than and closest to the desired post-capture zoom level.

17. The non-transitory machine readable medium of claim 15, further comprising instructions that, when executed by the at least one processor, cause the electronic device to:

generate a fused frame for each time instant based on the time-aligned frames from the selected lenses, wherein the given optical zoom level is equal to an optical zoom level that is less than and closest to the desired post-capture zoom level.

18. The non-transitory machine readable medium of claim 15, wherein the digital zoom level is equal to the desired post-capture zoom level divided by the given optical zoom level.

19. The non-transitory machine readable medium of claim 15, wherein the multiple frames from each of the multiple lenses include frames of a first duration and frames of a second duration longer than the first duration.

20. The non-transitory machine readable medium of claim 15, further comprising instructions that, when executed by the at least one processor, cause the electronic device to perform depth estimation based on frames from each of the multiple lenses.

* * * * *